United States Patent
Kohketsu et al.

(10) Patent No.: US 6,792,917 B2
(45) Date of Patent: Sep. 21, 2004

(54) PRESSURE-ELEVATING TYPE FUEL INJECTING SYSTEM

(75) Inventors: Susumu Kohketsu, Tokyo (JP); Shinji Nakayama, Tochigi (JP); Keiki Tanabe, Tochigi (JP)

(73) Assignee: Mitsubishi Fuso Truck & Bus Corporation, Tokyo (JP)

( * ) Notice: Subject to any disclaimer, the term of this patent is extended or adjusted under 35 U.S.C. 154(b) by 0 days.

(21) Appl. No.: 10/413,555

(22) Filed: Apr. 15, 2003

(65) Prior Publication Data

US 2003/0213470 A1 Nov. 20, 2003

(30) Foreign Application Priority Data

Apr. 30, 2002 (JP) .................................. 2002-128750

(51) Int. Cl.$^7$ ............................................... F02M 37/04
(52) U.S. Cl. .................. 123/446; 123/447; 123/478; 123/510
(58) Field of Search .................. 123/445, 446, 123/447, 456, 457, 458, 506, 510, 511, 514, 496, 478, 480

(56) References Cited

U.S. PATENT DOCUMENTS

| | | | |
|---|---|---|---|
| 5,634,448 A | * | 6/1997 | Shinogle et al. ............ 123/480 |
| 6,557,530 B1 | * | 5/2003 | Benson et al. ............... 123/480 |
| 6,561,164 B1 | * | 5/2003 | Mollin ........................ 123/446 |
| 6,694,953 B2 | * | 2/2004 | Barnes et al. ................ 123/500 |
| 6,725,147 B2 | * | 4/2004 | Mollin ........................ 701/104 |

* cited by examiner

Primary Examiner—Weilun Lo
(74) Attorney, Agent, or Firm—Birch, Stewart, Kolasch & Birch, LLP

(57) ABSTRACT

A pressure-elevating type fuel injecting system pressurizes high pressure fuel from a pressure accumulating chamber using a pressure-elevating mechanism and injects the pressure-elevated fuel into combustion chambers by injectors. The pressure-elevating type fuel injecting system comprises a target fuel injection quantity setting unit which sets a target fuel injection quantity, a time difference setting unit which sets a time difference between a timing for opening an injector electromagnetic valve and a timing for operating an pressure-elevating mechanism electromagnetic valve, an initial fuel injection quantity calculating unit calculating an initial fuel injection quantity on the basis of a time-dependent variation of fuel pressure and the time difference, and a final injection period setting unit which calculates an operation period of the injector electromagnetic valve, on the basis of a final fuel injection quantity and the time-dependent variation of the pressure of the pressure-elevated fuel.

3 Claims, 5 Drawing Sheets

CRANK ANGLE

RELATED ART

PRESSURE-ELEVATING TYPE FUEL INJECTING SYSTEM

FIELD OF THE INVENTION

This invention relates to a pressure-elevating type fuel injecting system in which high pressure fuel from a pressure accumulating chamber is further pressurized by a pressure elevating mechanism and is injected into combustion chambers via injectors, and more particularly to a pressure-elevating type fuel injecting system which can precisely inject fuel to cope with a load in accordance with an operating state of an internal combustion engine.

DESCRIPTION OF THE RELATED ART

A pressure-elevating type fuel injecting system is one of fuel injecting systems which inject fuel to combustion chambers of an internal combustion engine via injectors. In such a pressure-elevating type fuel injecting system, high pressure fuel from a fuel supply is stored in a pressure accumulating chamber constituted by a common rail, and injector nozzles coupled to the common rail face with the combustion chambers. Further, a pressure elevating mechanism is disposed in a branch of a high pressure fuel supply path extending between the common rail and the injectors. In the pressure-elevating mechanism, a power piston is actuated by pressure of the high pressure fuel applied via the branch of the high pressure fuel path, and feeds the pressurized fuel to the injectors. In short, the power piston is operated by a pressure elevating piston electromagnetic valve. For instance, the pressure-elevating type fuel injecting system operates as shown in FIG. 5 of the accompanying drawings. Specifically, fuel injection is started when a signal n1 for actuating an injector electromagnetic valve is issued at a timing t01. Pressure Pc at the common rail is elevated when a signal n2 for actuating the pressure-elevating piston electromagnetic valve (called the "piston electromagnetic valve") is issued at a timing t02. Further, the pressurized fuel has a time-dependent pressure variation as shown by Ph, and is injected with a fuel injection ratio pm.

Fuel injection is carried out in two steps. Specifically, an initial fuel injection j1 is performed between the timing t01 (at which the injector electromagnetic valve is opened) and the timing t02 (at which the piston electromagnetic valve is opened), and a final fuel injection j2 is performed between the timing t02 and a timing t03 at which the injector electromagnetic valve is closed. This measure has been taken in order to reduce exhaust gases and engine noise.

In an ordinary common rail type fuel injecting system, an injection pressure usually corresponds to a common rail pressure. Therefore, an injector operating period corresponding to target fuel injection quantity is determined on the basis of the common rail pressure which is monitored immediately before the fuel injection, in place of the injection pressure.

However, with the pressure-elevating type fuel injecting system, an injection pressure of pressurized fuel does not correspond to the common rail pressure. In other words, the common rail pressure cannot be applied as the injection pressure. Therefore, the injection pressure has to be separately monitored.

In the foregoing case, a sensor should be provided at a nozzle hole of each injector in order to detect the injection pressure. However, it is very difficult to secure sensor spaces in the injectors. Further, the sensors have to be provided in all of the injectors, which is not advantageous in view of cost.

If the injection pressure is not monitored, it is impossible to determine operation periods of the injectors and piston electromagnetic valves on the basis of the common rail pressure which varies with operating states of the engine, the operation period of the pressurizing piston, and so on. Therefore, it is very difficult to precisely control the fuel injection and stabilize the engine control.

The present invention has been contemplated in order to overcome the foregoing problems and to provide a pressure-elevating type fuel injecting system in which fuel injection is precisely controlled in order to stabilize engine operations.

SUMMARY OF THE INVENTION

A pressurized fuel injecting system in which high pressure fuel from a pressure accumulating chamber is further pressurized by a pressure elevating mechanism and is injected into combustion chambers by injectors. The pressure-elevating type fuel injecting system comprises: a target fuel injection quantity setting unit which sets a target fuel injection quantity in accordance with an operating state of an engine operation; a time difference setting unit which sets a time difference between a timing for opening an injector electromagnetic valve enabling fuel injection or no-fuel injection from injectors, and a timing for opening an pressure-elevating mechanism electromagnetic valve turning on or off the pressure-elevating mechanism; an initial injection quantity calculating unit which calculates an initial fuel injection quantity on the basis of a time-dependent variation of fuel pressure during the opening of the pressure-elevating mechanism electromagnetic valve and the time difference derived by the time difference setting unit; and a final injection period setting unit which calculates an opening period of the injector electromagnetic valve, on the basis of a final fuel injection quantity derived by deducting the initial fuel injection quantity from the target fuel injection quantity, and the time-dependent variation of the pressure of the pressurized fuel during the opening of the pressure-elevating mechanism electromagnetic valve.

The initial injection quantity calculating unit calculates the initial fuel injection quantity on the basis of the time-dependent variation of the fuel pressure and the time difference calculated by the time difference setting unit. The final injection period setting unit calculates the final injection period on the basis of the final injection quantity derived by deducting the initial injection quantity from the target injection quantity, and the time-dependent variation of the fuel pressure. Therefore, it is not necessary to monitor the fuel pressure near nozzle holes of the injectors. Further, the fuel injection can be precisely controlled, and reliable and stable operation of the engine can be assured.

Further, the initial injection quantity calculating unit calculates the initial fuel injection quantity on the basis of the time-dependent variation of the fuel pressure during the opening of the pressure-elevating mechanism electromagnetic valve, the time difference, and fuel pressure in the pressure accumulating chamber. The initial fuel injection quantity is increased in response to an increase of the fuel pressure in the pressure accumulating chamber. The initial injection quantity can be precisely determined, so that the fuel injection can be appropriately controlled, and reliable and stable operation of the engine can be assured.

Still further, the final injection period setting unit calculates the final fuel injection period on the basis of the time-dependent pressure variation of the pressurized fuel during the opening of the pressure-elevating mechanism electromagnetic valve. The final fuel injection period is shortened in response to an increase of the fuel pressure in the pressure accumulating chamber. The final fuel injection quantity can be precisely determined, so that the fuel injection can be appropriately controlled, and reliable and stable operation of the engine can be assured.

DETAILED DESCRIPTION OF THE INVENTION

Figure 1:
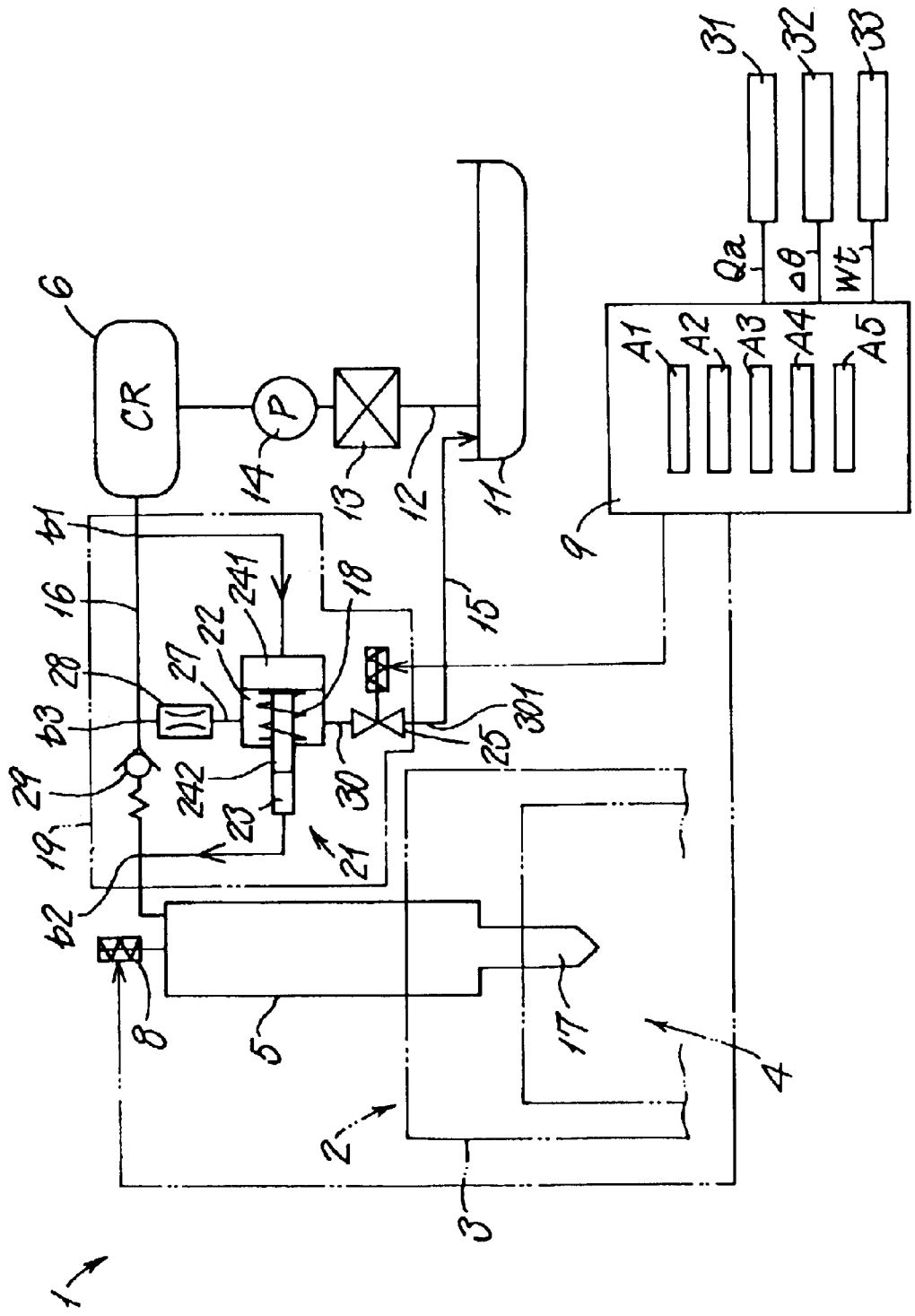
FIG. 1 is a schematic diagram of a pressure-elevating type fuel injecting system according to an embodiment of the invention.

The invention will be described with reference to one embodiment shown in FIG. 1 to FIG. 3.

A pressure-elevating type fuel injecting system 1 is installed in a multiple cylinder diesel engine 2 (called the "engine 2"), not shown. Specifically, the pressure-elevating type fuel injecting system 1 (called the "fuel injecting system 1") is mounted on an engine body 3 of the engine 2, and injects pressurized fuel to combustion chambers 4 in the engine body 3, in a two-step injection mode M1 or a single step injection mode M2. Only one combustion chamber 4 is shown in FIG. 1.

The fuel injection system 1 comprises: injectors 5 injecting fuel to each combustion chamber 4 in the engine body 3; a common rail 6 supplying high pressure fuel to the injectors 5; a high pressure fuel source 7 feeding the high pressure fuel to the common rail 6; and an engine controller 9 controlling the operation of injector electromagnetic valves 8.

The high pressure fuel source 7 includes a fuel tank 11, a pipe 12 via which the high pressure fuel is pressure-fed to the common rail 6, a feed pump 14 provided on the pipe 12, pressurizing the fuel from the fuel tank 11 via a filter 13 and pressure-feeding the fuel, and a low pressure pipe 15 collecting fuel returned from the injectors 5 and introducing the fuel to the fuel tank 11.

The common rail 6 is supported on the engine body 3 in a direction where cylinders are positioned, stores the high pressure fuel from the feed pump 14, and communicates with a main injection path 16 extending toward the injectors 5.

The injectors 5 are identically structured. Each injector 5 includes a nozzle 17 and an injector electromagnetic valve 8, and is connected to a fuel pressure-elevating section 19. The nozzle 17 is attached to the engine body 3 in order to inject the fuel into the combustion chamber 4. The injector electromagnetic valve 8 is opened or closed in response to an actuation signal from the controller 9, thereby enabling the high pressure fuel to be injected into the combustion chamber 4 via the main injection path 16 and the nozzle 17.

The fuel pressure elevating section 19 includes the main injection path 16, from which a pressure-elevating mechanism 21 is branched. The pressure-elevating mechanism 21 is provided with large and small cylinder chambers 22 and 23 which are in parallel with the main injection path 16. The cylinder chambers 22 and 23 house a pressurizing piston 241 having large and small diameter portions. The large cylinder chamber 22 communicates with an upstream branch b1 (near the common rail) via one end thereof while the small cylinder chamber 23 communicates with a downstream branch b2 (near the injector). The large cylinder chamber 22 communicates with a pressure releasing path 30 via a part thereof near the small cylinder chamber 23, and with a pressure regulating path 27. The pressure releasing path 30 includes a pressure-elevating mechanism electromagnetic valve 25 which operates the pressure-elevating mechanism 21. The pressure regulating path 27 communicates with an intermediate branch b3 of the main injection path 16 via a throttle 28. Further, a check valve 29 is provided between the downstream branch b1 and intermediate branch b3 in order to prevent the fuel from flowing to the common rail 6 from the injector 5.

The pressure-elevating mechanism electromagnetic valve 25 is opened or closed in response to an actuation signal from the controller 9, and opens or closes the pressure releasing path 30 and the large cylinder chamber 22. As a result, a pressure difference is caused on the front and rear surfaces of the pressurizing piston 241, which is moved to the left by pressure (as shown in FIG. 1), and elevates the pressure of the fuel at the downstream branch b2.

The pressure releasing path 30 has an outlet 301, which connects to the low pressure pipe 15 introducing low pressure fuel to the fuel tank 11. A return spring 18 pushes the pressurizing piston 241 to the upstream branch b1.

The controller 9 has a number of ports in its input and output circuits, to which various sensors are connected in order to collect operating data of the engine. Specifically, the sensors are an accelerator pedal sensor 31 detecting an opening angle θa of an accelerator of the engine 2, a crank angle sensor 32 collecting crank angle data Δθ, and a water temperature sensor 33 detecting a water temperature wt. The crank angle data Δθ are used for an engine ECU 2 to derive an engine speed Ne.

The controller 9 functions not only as an ordinary engine controller but also serves for the fuel injecting system 1 as a target injection quantity setting unit A1, a time difference setting unit A2, an initial fuel injection quantity calculating unit A3, a final injection period setting unit A4 and an injector valve opening period setting unit A5.

Figure 2:
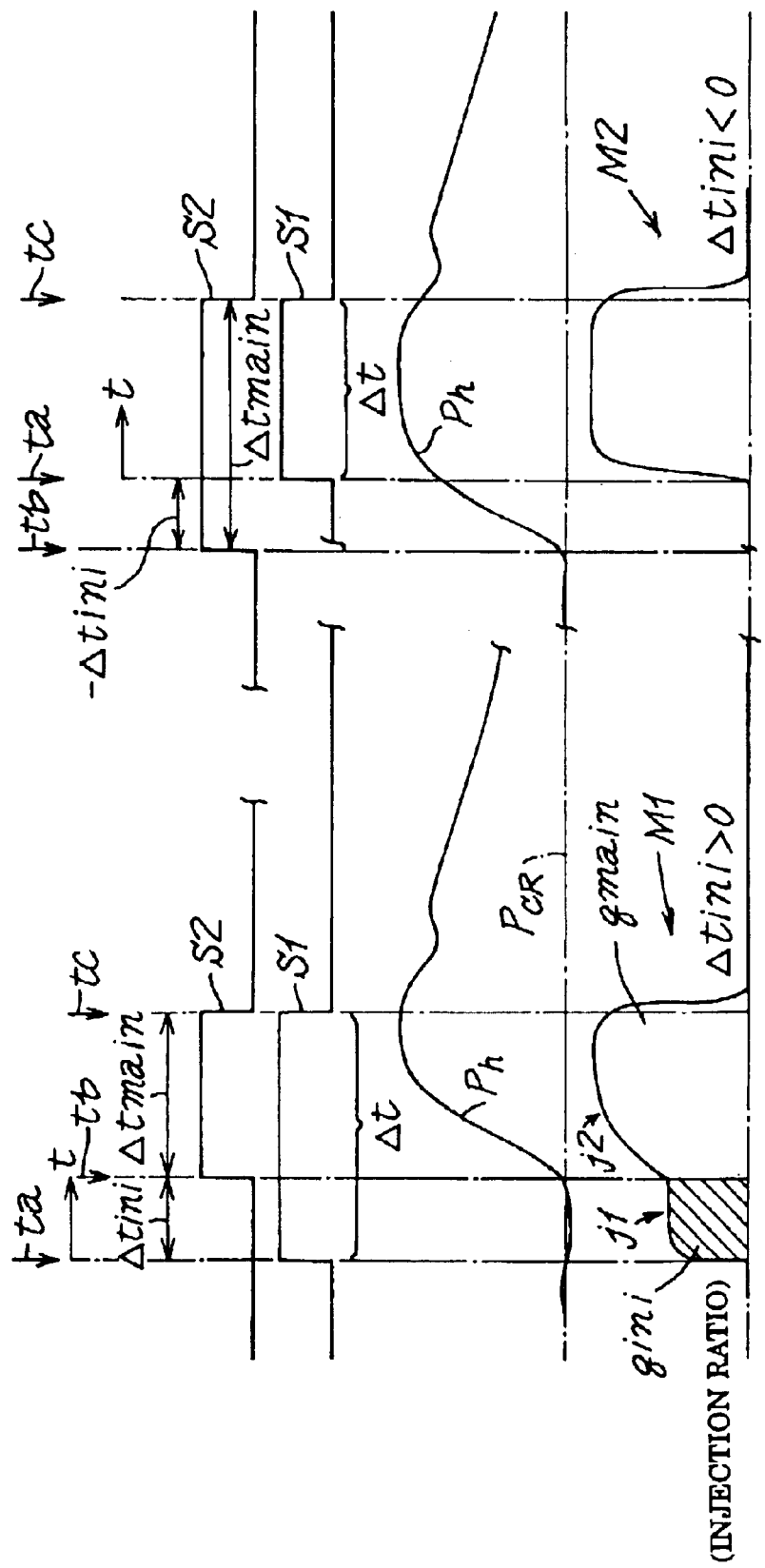
FIG. 2 is a graph showing two-step and single step injection modes in the pressure-elevating type fuel injecting system.
Figure 3:
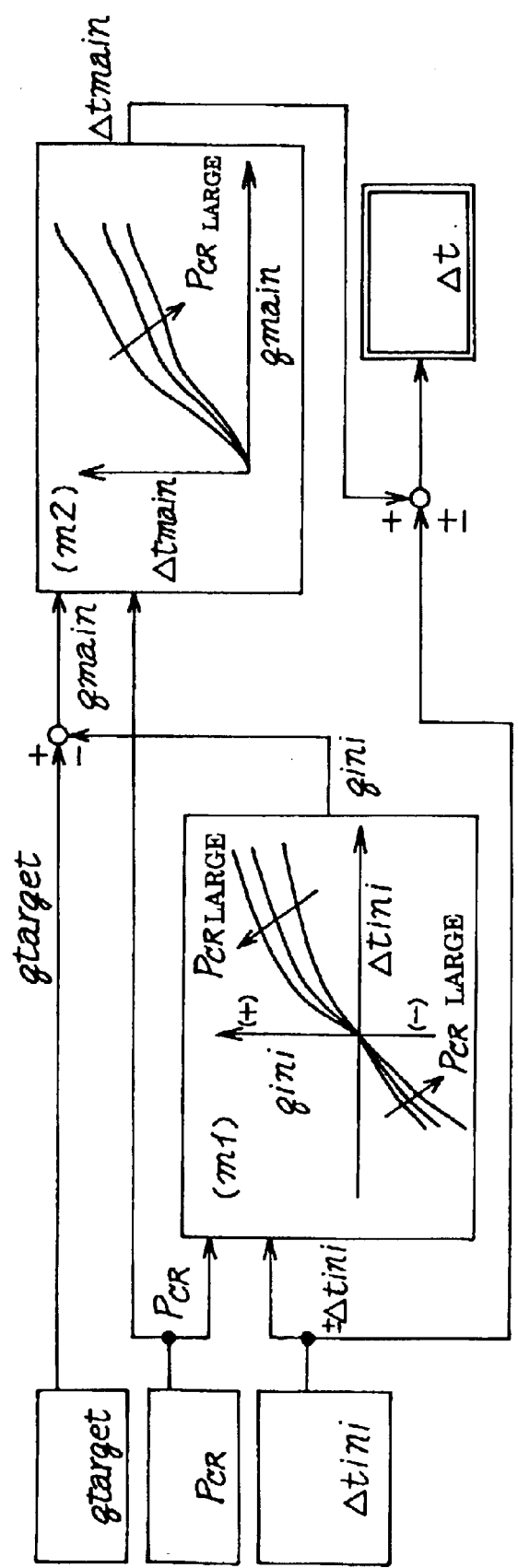
FIG. 3 is a block diagram of the pressure-elevating type fuel injecting system.

Referring to FIG. 2, the fuel injecting system 1 initiates the fuel injection when a signal s1 for actuating the injector electromagnetic valve 18 is issued at a valve opening timing ta. Pressure of the fuel at the downstream branch b2 of the main injection path 16 is elevated when a signal s2 for actuating the pressurizing electromagnetic valve 25 is issued at a valve opening timing tb. The fuel pressure varies with time as shown by Ph in FIG. 2. The controller 9 controls the fuel injecting system 1 in order that the fuel injection is executed in the two-step injection mode M1 or in the single step injection mode M2.

In the two-step injection mode M1, the fuel injection is carried out in two steps, i.e. the initial fuel injection is started between the opening timing ta of the injector electromagnetic valve 8 and the opening timing tb of the pressure-elevating mechanism electromagnetic valve 25, and a final fuel injection j2 is carried out between the opening timing tb of the pressurize-elevating mechanism electromagnetic valve 25 and the closing timing tc of the injector electromagnetic valve 8. This is effective in reducing Nox in exhaust gases and combustion noise in the engine.

The target injection quantity setting unit A1 calculates a target fuel injection quantity $q_{target}$ using a target fuel injection quantity map (not shown) in accordance with an engine speed Ne representative of an operating state of the engine and an accelerator pedal opening quantity θa.

In accordance with the operating state of the engine 2, the time difference setting unit A2 sets a time difference $\Delta t_{ini}$ (shown in FIG. 2) between the opening timing ta of the injector electromagnetic valve 8 for determining the fuel injection or non-fuel injection from the injectors 5 and the valve opening timing tb of the pressure-elevating mechanism electromagnetic valve 25 for operating or releasing the pressure-elevating mechanism 21.

The initial fuel injection quantity calculating unit A3 calculates, using an initial fuel injection quantity map m1, an initial fuel injection quantity $q_{ini}$ on the basis of a time-dependent variation Ph of the fuel pressure when injector electromagnetic valves 8 is operated, and the time difference $\Delta t_{ini}$ received from the time difference setting unit A2.

The final fuel injection period calculating unit A4 calculates the final fuel injection period (opening period of the injector valves 8) $\Delta t_{main}$ on the basis of a final injection quantity $q_{main}$, which is derived by deducting the initial injection quantity $q_{ini}$ from the target fuel injection quantity $q_{target}$, and the time-dependent pressure variation Ph of the fuel when the pressure-elevating mechanism electromagnetic valve 25 is opened. This calculation is performed using a final injection period map m2 shown in FIG. 3.

The injector valve opening period calculating unit A5 calculates an injector valve opening period Δt by adding the final injection period $\Delta t_{main}$ and the time difference (initial injection period) $\Delta t_{ini}$. If the time difference $\Delta t_{ini}$ is negative, it is deducted from the final injection period $\Delta t_{main}$.

Figure 4:
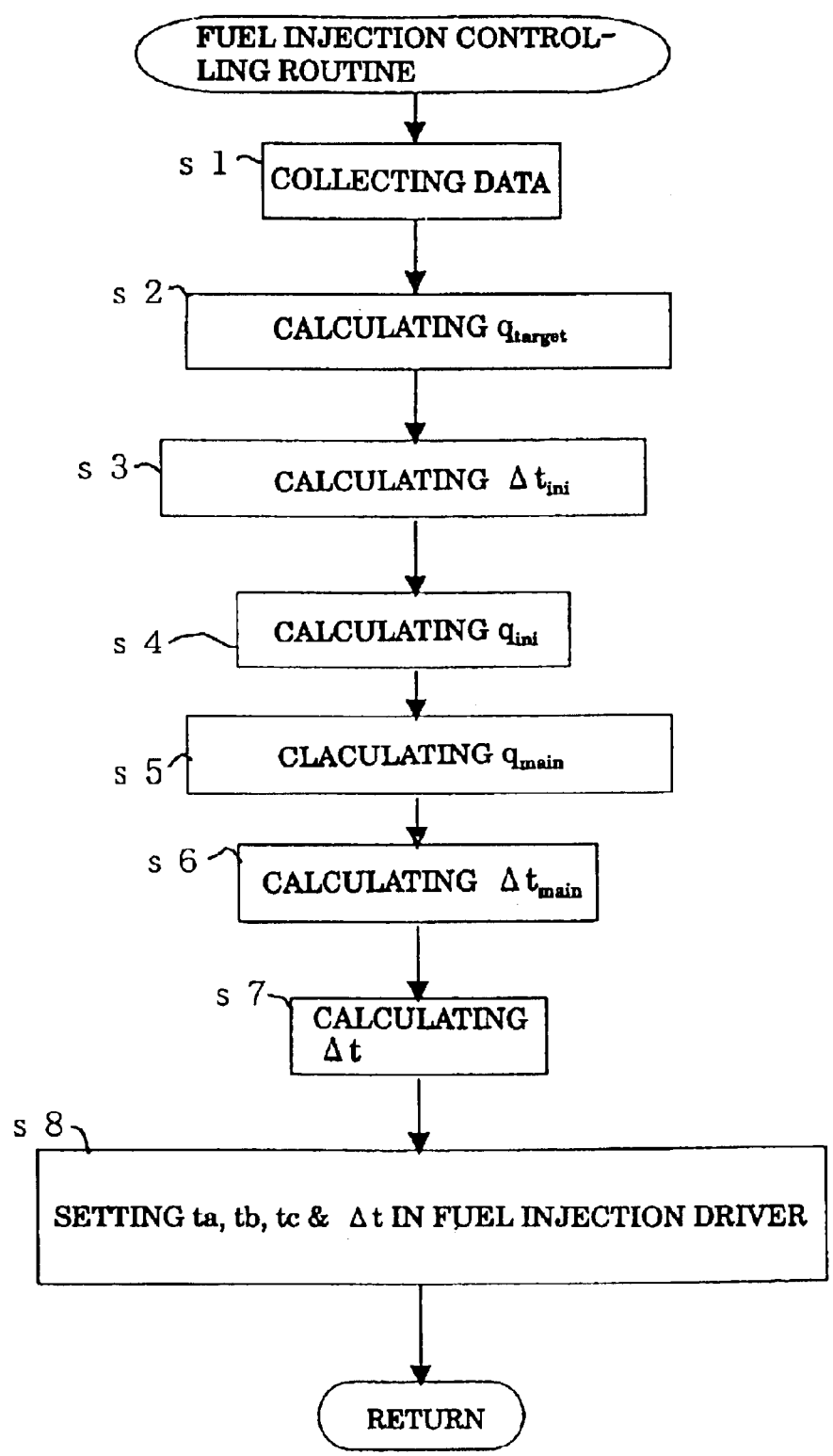
FIG. 4 is a flowchart showing a fuel injection control routine of the pressure-elevating type fuel injecting system.
Figure 5:
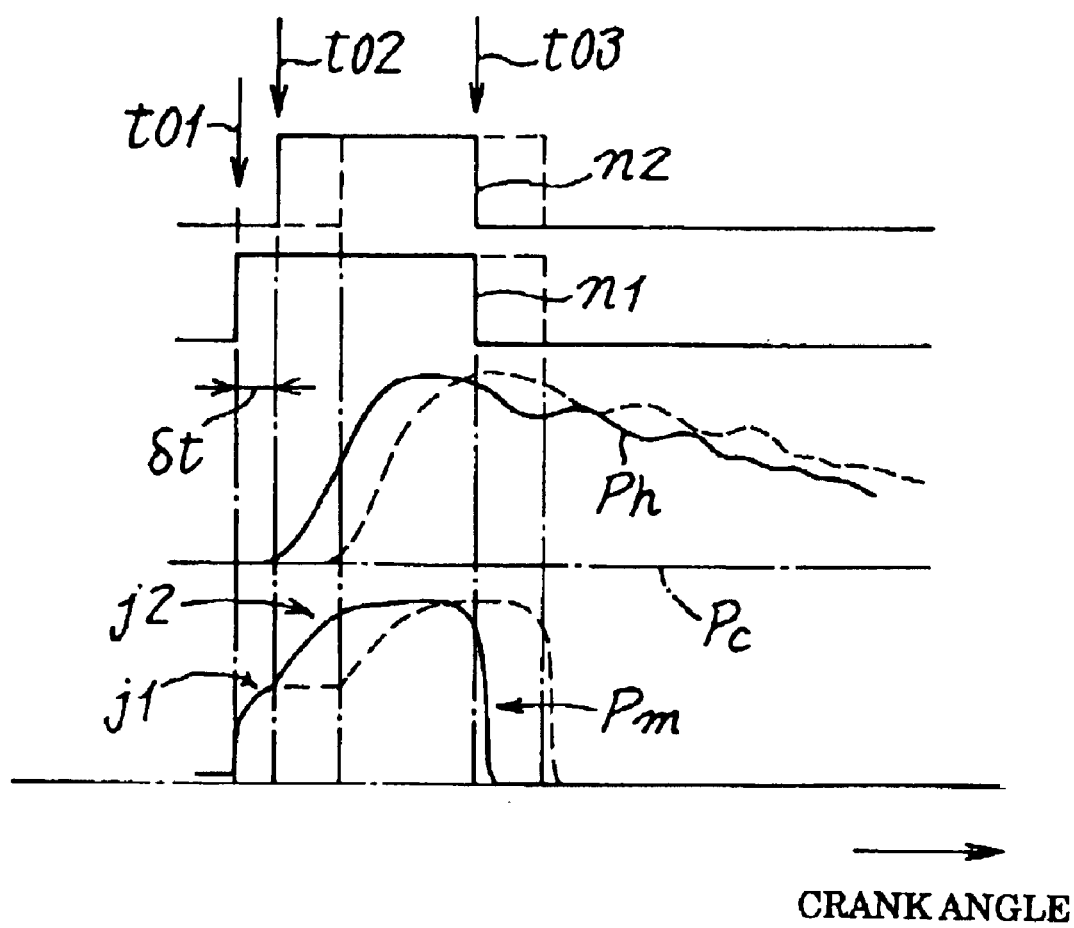
FIG. 5 shows fuel injection ratios of a fuel injecting system of the related art.

The operation of the fuel injecting system 1 will be described according to a fuel injection controlling routine shown in FIG. 4.

In step s1, latest data such as a common rail pressure Pcr, engine speed Ne, accelerator opening angle θa, crank angle Δθ, and temperature wt are collected and stored.

In step s2, the target fuel injection quantity $q_{target}$ is calculated in accordance with the engine speed Ne and accelerator pedal opening angle θa, using a target fuel injection quantity map, not shown.

In step s3, the time difference $\Delta t_{ini}$ between the opening timing ta of the injector electromagnetic valve 8 and the opening timing tb of the pressure-elevating electromagnetic valve 25 is calculated using a time difference map (not shown). The time difference $\Delta t_{ini}$ may be reduced in accordance with the water temperature wt of the engine, using a calculation map (not shown).

Especially, in the two-step injection mode M1, the time difference $\Delta t_{ini}$(=ta−tb) is designed to be positive while in the single step injection mode M2, the time difference $\Delta t_{ini}$ is designed to be negative.

In step s4, the initial injection quantity $q_{ini}$ is calculated in accordance with the time-dependent variation of the fuel pressure due to the operation of the pressure-elevating mechanism electromagnetic valve 25, current common rail pressure Pcr and time difference $\Delta t_{ini}$, using the initial injection quantity setting map m1. In the case of the two-step injection mode M1, the pressure-elevating electromagnetic valve 25 operates after the injector electromagnetic valve 8 does. The initial injection quantity $q_{ini}$ can be derived on the basis of the relationship between the common rail pressure Pcr and the time difference $\Delta t_{ini}$, since initial injection quantity $q_{ini}$ is not affected by the time-dependent variation of the fuel pressure. In the case of the single step injection mode M2, the pressure-elevating electromagnetic valve 25 is opened prior to the injector electromagnetic valve 8, and the time difference $\Delta t_{ini}$ is set to be negative, so that a negative initial injection quantity ($-\Delta t_{ini}$) is derived on the basis of the relationship between the time-dependent variation of the fuel pressure and the time difference $\Delta t_{ini}$, using the initial injection quantity map m1. In step s6, the final injection quantity $q_{main}$ is derived by deducting the initial injection quantity $q_{ini}$ from the current target injection quantity $q_{target}$. Since it is negative in the single step injection mode M2, the initial injection quantity $q_{ini}$ is added to the target injection quantity $q_{target}$.

In step s6, the opening period $\Delta t_{main}$ of the injector electromagnetic valve 8 (i.e. the final injection period) is calculated in accordance with the final injection quantity $q_{main}$ and the current common rail pressure Pcr, using the final injection quantity setting map m2.

In step s7, a current injector valve opening period Δt is calculated by adding the time difference $\Delta t_{ini}$ and the final injection period $\Delta t_{main}$. In the case of the single step injection mode M2, the opening period Δt is derived by deducting $\Delta t_{ini}$ from $\Delta t_{main}$.

In step s8, the following data are set in a fuel injection driver (not shown): the injector electromagnetic valve opening period Δt; valve opening timing ta corresponding to the time difference $\Delta t_{ini}$; valve opening timing tb; and valve closing timing tc. In this state, the fuel injection control routine will be completed, and returned to the initial state.

In response to the crank angle signal Δθ, the fuel injection driver counts the valve opening timing ta, the valve opening timing tb, and the valve closing timing tc. Then, the fuel injection driver issues an output, so that the injectors 5 are operated to inject the fuel in either the two-step or single step injection mode M1 or M2.

In the fuel injecting system 1, the initial injection quantity calculating unit A3 calculates the initial injection quantity $q_{ini}$ on the basis of the time-dependent variation Ph of the fuel pressure, the time difference $\Delta t_{ini}$ obtained from the time difference setting unit A2. The final injection period setting unit A4 calculates the final injection period $\Delta t_{main}$ (i.e. open period of the injector electromagnetic valve) on the basis of the final injection quantity $q_{main}$ (which is derived by deducting the initial injection quantity $q_{ini}$ from the target injection quantity $q_{target}$) and the time-dependent variation Ph of the fuel pressure due to the operation of the pressure-elevating mechanism 21. Therefore, the fuel injection can be precisely controlled, and stable engine operation can be accomplished without an increase of cost, because no fuel pressures are monitored near the nozzle holes of the injectors 5.

In both the two-step and single step injection modes M1 and M2, the initial injection quantity $q_{ini}$ is calculated using the initial injection quantity map m1. The initial injection quantity $q_{ini}$ corresponding to the time difference $\Delta t_{ini}$ is positive in the two-step injection mode M1, while the initial injection quantity $q_{ini}$ corresponding to the time difference $\Delta t_{ini}$ is negative in the single step injection mode M2. When the final injection period $\Delta t_{main}$ is calculated using the map m2, the positive initial injection quantity $t_{ini}$ is added to the final injection period $\Delta t_{main}$ while the negative initial injection quantity $t_{ini}$ is deducted from the final injection period $\Delta t_{main}$. The fuel injection in the two-step or single step injection mode M1 or M2 can be reliably controlled using the maps m1 and m2, and by the same processing. This is effective in simplifying the control procedure.

What is claimed is:

1. A pressure-elevating type fuel injecting system in which high pressure fuel from a pressure accumulating chamber is further pressurized by a pressure-elevating mechanism and is injected into combustion chambers by injectors, the pressure-elevating type fuel injecting system comprising:

a target fuel injection quantity setting unit which sets a target fuel injection quantity in accordance with an operating state of an engine;

a time difference setting unit which sets a time difference between a timing for opening an injector electromagnetic valve enabling fuel injection or no-fuel injection from injectors, and a timing for opening a pressure-elevating mechanism electromagnetic valve turning on or off the pressure-elevating mechanism;

an initial injection quantity calculating unit which calculates an initial fuel injection quantity on the basis of a time-dependent variation of fuel pressure during the opening of the pressure-elevating mechanism electromagnetic valve and the time difference derived by the time difference setting unit; and a final injection period calculating unit which calculates an opening period of the injector electromagnetic valve, on the basis of a final fuel injection quantity derived by deducting the initial fuel injection quantity from the target fuel injection quantity, and the time-dependent pressure variation of the pressurized fuel during the opening of the pressure-elevating mechanism electromagnetic valve.

2. The fuel injecting system of claim 1, wherein the initial injection quantity calculating unit calculates the initial fuel injection quantity on the basis of the time-dependent variation of the fuel pressure during the opening of the pressure-elevating mechanism electromagnetic valve, the time difference, and fuel pressure in the pressure accumulating chamber, the initial fuel injection quantity being increased in response to an increase of the fuel pressure in the pressure accumulating chamber.

3. The fuel injecting system of claim 1, wherein the final injection period calculating unit calculates the final fuel injection period on the basis of the time-dependent pressure variation of the pressurized fuel during the opening of the pressure-elevating mechanism electromagnetic valve, the final fuel injection period being shortened in response to an increase of the fuel pressure in the pressure accumulating chamber.

* * * * *